United States Patent
Ghesu et al.

(10) Patent No.: US 10,373,313 B2
(45) Date of Patent: Aug. 6, 2019

(54) SPATIALLY CONSISTENT MULTI-SCALE ANATOMICAL LANDMARK DETECTION IN INCOMPLETE 3D-CT DATA

(71) Applicant: Siemens Healthcare GmbH, Erlangen (DE)

(72) Inventors: Florin Cristian Ghesu, Erlangen (DE); Bogdan Georgescu, Plainsboro, NJ (US); Sasa Grbic, Princeton, NJ (US); Dorin Comaniciu, Princeton Junction, NJ (US)

(73) Assignee: Siemens Healthcare GmbH, Erlangen (DE)

( * ) Notice: Subject to any disclaimer, the term of this patent is extended or adjusted under 35 U.S.C. 154(b) by 95 days.

(21) Appl. No.: 15/695,112

(22) Filed: Sep. 5, 2017

(65) Prior Publication Data

US 2018/0253837 A1    Sep. 6, 2018

Related U.S. Application Data

(60) Provisional application No. 62/466,036, filed on Mar. 2, 2017.

(51) Int. Cl.
*G06K 9/00* (2006.01)
*G06T 7/00* (2017.01)
(Continued)

(52) U.S. Cl.
CPC .......... *G06T 7/0012* (2013.01); *G06K 9/6232* (2013.01); *G06T 7/75* (2017.01);
(Continued)

(58) Field of Classification Search
CPC . G06T 7/0012; G06T 7/75; G06T 7/11; G06T 7/73; G06T 7/174; G06T 7/143;
(Continued)

(56) References Cited

U.S. PATENT DOCUMENTS

2007/0269111 A1    11/2007  Bolin et al.
2014/0219526 A1*   8/2014   Linguraru .......... G06K 9/00281
                                                     382/128
(Continued)

OTHER PUBLICATIONS

European Extended Search Report (EESR) dated Jul. 9, 2018 in corresponding European Patent Application No. 18159699.0.
(Continued)

*Primary Examiner* — Jose L Couso (57) ABSTRACT

A method and system for automated spatially-consistent multi-scale detection of anatomical landmarks in medical images is disclosed. A discrete scale-space representation of a medical image of a patient is generated. A plurality of anatomical landmarks are detected at a coarsest scale-level of the discrete scale-space representation of the medical image using a respective trained search model trained at the coarsest scale-level for each of the plurality of anatomical landmarks. Spatial coherence of the detected anatomical landmarks is enforced by fitting a learned robust shape model of the plurality of anatomical landmarks to the detected anatomical landmarks at the coarsest scale-level to robustly determine a set of the anatomical landmarks within a field-of-view of the medical image. The detected landmark location for each of the landmarks in the set of anatomical landmarks is refined at each remaining scale-level of the discrete scale-space representation of the medical image using, for each landmark, a respective trained search model trained at each remaining scale-level and constrained based on the predicted landmark location at a previous scale-level.

25 Claims, 6 Drawing Sheets

(51) Int. Cl.
*G06K 9/62* (2006.01)
*G06T 7/73* (2017.01)

(52) U.S. Cl.
CPC . *G06K 2209/051* (2013.01); *G06K 2209/055* (2013.01); *G06T 2207/20016* (2013.01); *G06T 2207/30004* (2013.01)

(58) Field of Classification Search
CPC ........... G06T 7/60; G06T 7/0014; G06T 7/12; G06T 7/155; G06T 7/33; G06T 7/337; G06T 7/74; G06T 7/2207; G06T 7/10072; G06T 7/10136; G06T 7/20081; G06T 7/30004; G06T 7/30048; G06T 7/20016; G06K 9/6232; G06K 9/621; G06K 9/00281; G06K 9/6267; G06K 9/66; G06K 9/6256; G06K 9/6297; G06K 9/627; G06K 9/00523; G06K 9/00536; G06K 9/4638; G06K 9/36; G06K 9/6282; G06K 9/4604; G06K 2209/051; G06K 2209/05; G06K 2209/055; A61B 5/7267; A61B 5/055; A61B 5/7264; A61B 5/0033; A61B 6/5217; A61B 8/5223; A61B 8/08; A61B 8/463; A61B 8/52; G06F 3/08; G06F 3/0454; G06F 99/005; A61N 5/1039; G16H 50/20
See application file for complete search history.

(56) References Cited

U.S. PATENT DOCUMENTS

2014/0294276 A1 10/2014 Song et al.
2017/0323447 A1* 11/2017 Tsukagoshi ............ A61B 6/032
2017/0372473 A1* 12/2017 Ujiie ..................... G06F 3/0482
2018/0061058 A1* 3/2018 Xu ........................ G06K 9/6269
2018/0330207 A1* 11/2018 Zhou .................... G06K 9/6297

OTHER PUBLICATIONS

Torr, P.H.S., Zisserman, A: MLESAC: A new robust estimator with application to estimating image geometry. Elsevier CVIU 78, 138{156 (2000).

Ghesu, F.C., Georgescu, B., Mansi, T., Neumann, D., Homegger, J., Comaniciu, D: An artificial agent for anatomical landmark detection in medical images. In: Ourselin, S., Joskowicz, L., Sabuncu, M.R., Unal, G., Wells, W. (eds.) MICCAI 2016, Part III. LNCS. pp. 229{237 (2016).

Ghesu, F.C., Krubasik, E., Georgescu, B., Singh, V., Zheng, Y., Homegger, J., Comaniciu, D: Marginal Space Deep Learning: Efficient architecture for volumetric image parsing. IEEE TMI 35(5), 1217{1228 (2016).

Lindeberg, T.: Scale-Space Theory in Computer Vision. Kluwer Academic Publishers, Norwell, MA, USA (1994).

Mnih, V., Kavukcuoglu, K., Silver, D., Rusu, A.A., Veness, J., Bellemare, M.G., Graves, A., Riedmiller, M., Fidjeland, A.K., Ostrovski, G., Petersen, S., Beattie, C., Sadik, A., Antonoglou, I., King, H., Kumaran, D., Wierstra, D., Legg, S., Hassabis, D.: Human-level control through deep reinforcement learning. Nature 518(7540), 529{533 (Feb. 2015).

Payer, C., Stern, D., Bischof, H., Urschler, M.: Regressing heatmaps for multiple landmark localization using cnns. In: Ourselin, S., Joskowicz, L., Sabuncu, M.R., Unal, G., Wells, W. (eds.) MICCAI 2016, Part II. LNCS. pp. 230{238. Springer International Publishing (2016).

Sutton, R.S., Barto, A.G.: Introduction to Reinforcement Learning. MIT Press, 1st edn. (1998).

Watkins, C.J.C.H., Dayan, P.: Q-learning. Machine Learning 8(3), 279{292 (1992).

* cited by examiner

|  |  | Left Kidney | Right Kidney | Left Hip Bone | Right Hip Bone | Left Common Carotid | Brachiocephalic Artery | Left Subclavian Artery | Bronchial Bifurcation |
|---|---|---|---|---|---|---|---|---|---|
| FP Rate | MSDL[1] | 1.5% | 1.5% | 1.1% | 1.2% | 1.0% | 1.0% | 1.1% | 1.0% |
|  | Ours | 0% | 0% | 0% | 0% | 0% | 0% | 0% | 0% |
| FN Rate | MSDL[1] | 13.9% | 9.4% | 1.2% | 0.4% | 10.8% | 11.3% | 7.2% | 4.9% |
|  | Ours | 0% | 0% | 0% | 0% | 0% | 0% | 0% | 0% |
| Mean | MSDL[1] | 6.17 | 6.35 | 4.92 | 3.56 | 4.78 | 5.96 | 5.35 | 5.15 |
|  | Ours | 6.83 | 6.98 | 3.61 | 2.63 | 4.02 | 4.36 | 4.23 | 4.07 |
| Median | MSDL[1] | 5.64 | 5.80 | 4.78 | 3.44 | 4.17 | 5.58 | 4.82 | 3.88 |
|  | Ours | 6.32 | 6.61 | 2.83 | 2.49 | 2.86 | 3.46 | 3.21 | 3.77 |
| STD | MSDL[1] | 3.32 | 3.96 | 2.88 | 1.93 | 3.33 | 3.92 | 3.51 | 2.82 |
|  | Ours | 3.62 | 3.83 | 2.68 | 1.53 | 3.33 | 2.97 | 3.37 | 2.16 |

FIG. 6

SPATIALLY CONSISTENT MULTI-SCALE ANATOMICAL LANDMARK DETECTION IN INCOMPLETE 3D-CT DATA

This application claims the benefit of U.S. Provisional Application No. 62/466,036, filed Mar. 2, 2017, the disclosure of which is herein incorporated by reference.

BACKGROUND OF THE INVENTION

The present invention relates to anatomical landmark detection in medical image data, and more particularly, to spatially consistent multi-scale deep learning based detection of anatomical landmarks in medical image data.

Fast and robust anatomical object detection is a fundamental task in medical image analysis that supports the entire clinical imaging workflow from diagnosis, patient stratification, therapy planning, intervention, and follow-up. Automatic detection of an anatomical object is a prerequisite for many medical image analysis tasks, such as segmentation, motion tracking, and disease diagnosis and quantification.

Machine learning based techniques have been developed for anatomical landmark detection in medical images. For example, machine learning techniques for quickly identifying anatomy in medical images include Marginal Space Learning (MSL), Marginal Space Deep Learning (MSDL), Marginal Space Deep Regression (MSDR), and Approximated Marginal Space Deep Learning (AMSD). While machine learning techniques are often applied to address the problem of detecting anatomical structures in medical images, the traditional object search scheme used in such techniques is typically driven by suboptimal and exhaustive strategies. Furthermore, these techniques do not effectively address cases of incomplete data, i.e., scans taken with a partial field-of-view. Addressing these limitations of conventional anatomical landmark detection techniques is important to enable artificial intelligence to directly support and increase the efficiency of the clinical workflow from admission through diagnosis, clinical care, and patient follow-up.

BRIEF SUMMARY OF THE INVENTION

The present disclosure relates to methods and systems for automated computer-based spatially consistent multi-scale detection of anatomical landmarks in medical images. Embodiments of the present invention provide robust and fast multi-scale detection of anatomical landmarks in medical images and are capable of reliable landmark detection in incomplete medical images (i.e., medical images with partial field-of-views). Embodiments of the present invention enforce spatial coherence of multi-scale detection of a set of anatomical landmarks in a medical image.

In one embodiment of the present invention, a discrete scale-space representation of a medical image of a patient is generated, wherein the discrete scale-space representation of the medical image includes a plurality of scale-levels. A plurality of anatomical landmarks are detected at a coarsest scale-level of the discrete scale-space representation of the medical image using a respective trained search model trained to predict a trajectory from a starting location to a predicted landmark location at the coarsest scale-level for each of the plurality of anatomical landmarks. Spatial coherence of the detected anatomical landmarks is enforced by fitting a learned shape model of the plurality of anatomical landmarks to the detected anatomical landmarks at the coarsest scale-level to robustly determine a set of the anatomical landmarks within a field-of-view of the medical image. The detected landmark location for each of the landmarks in the set of anatomical landmarks is refined at each remaining scale-level of the discrete scale-space representation of the medical image using, for each landmark in the set of anatomical landmarks, a respective trained search model trained to predict a trajectory to a predicted landmark location at each remaining scale-level, wherein the trained search model for each remaining scale-level for each landmark is constrained based on a range surrounding the predicted landmark location for that landmark at a previous scale-level.

These and other advantages of the invention will be apparent to those of ordinary skill in the art by reference to the following detailed description and the accompanying drawings.

DETAILED DESCRIPTION

The present disclosure relates to methods and systems for automated computer-based spatially consistent multi-scale detection of anatomical landmarks in medical images. Embodiments of the present invention are described herein to give a visual understanding of the anatomical landmark detection method. A digital image is often composed of digital representations of one or more objects (or shapes). The digital representation of an object is often described herein in terms of identifying and manipulating the objects. Such manipulations are virtual manipulations accomplished in the memory or other circuitry/hardware of a computer system. Accordingly, is to be understood that embodiments of the present invention may be performed within a computer system using data stored within the computer system.

Robust and fast computer-based automated detection of anatomical structures in medical images is an important task for next-generation automated medical support tools. While machine learning techniques are often applied to address this problem, the traditional object search scheme is typically driven by suboptimal and exhaustive strategies. One limitation with traditional machine learning anatomical landmark detection techniques is that they do not effectively addresses cases of incomplete data, i.e., medical image scans taken with a partial field-of-view. Deep scanning-based methods represent one main category of machine learning based anatomical landmark detection solutions. In deep-scanning based methods, such as Marginal Space Deep Learning (MSDL), the problem of anatomical landmark detection in medical images is typically reformulated to a patch-wise classification between positive and negative hypotheses, sampled as volumetric boxes of image intensities. Alternatively, end-to-end deep learning systems based on fully convolutional architectures approach the problem of anatomical landmark detection in medical images by learning a direct mapping f(I)=M between the original image I and a coded map M highlighting the locations of anatomical landmarks. However, in cases of over thousands of large range 3D CT scans at high spatial resolution (e.g., 2 mm or less), the training of such deep learning systems becomes infeasible due to excessive memory requirements and high computational complexity. Furthermore, for incomplete data, all of these deep learning based systems share a common limitation in that they rely on suboptimal or inaccurate heuristics such as probability thresholding to recognize whether an anatomical landmark is visible in the field-of-view of the 3D scan.

Embodiments of the present invention provide improvements to the technology of computer-based automated anatomical landmark detection in medical images, as compared to traditional machine learning based techniques for anatomical landmark detection. Embodiments of the present invention provide faster and more accurate detection of anatomical landmarks, as compared to existing deep learning based techniques for anatomical landmark detection. Embodiments of the present invention provide increased robustness for landmark detection in cases of incomplete data. As used herein, "incomplete data" refers to a medical image scan with a partial field-of-view that is missing one or more of the landmarks to be detected. Embodiments of the present invention also utilize a multi-scale landmark detection method that reduces memory requirements and computational complexity as compared to existing deep learning based techniques. Embodiments of the present invention address the above described limitations of existing deep learning based anatomical landmark detection techniques by using a scale-space model and robust statistical shape modeling for multi-scale spatially-coherent landmark detection.

In general, the continuous scale-space of a 3D image signal $I \in \mathbb{Z}^3 \to \mathbb{R}_+$ is defined as: $L(x, t) = \Sigma_{\xi \in \mathbb{Z}^3} T(\xi, t) I(x-\xi)$, where $t \in \mathbb{R}_+$ denotes the continuous scale-level, $x \in \mathbb{Z}$, $L(x, 0) = I(x)$, and T defines a one-parameter kernel-family. The main properties of such a scale-space representation are the non-enhancement of local extrema and implicitly the causality of structure across scales. These properties are important for the robustness of a search process, starting from coarse to fine scale. According to an advantageous embodiment of the present invention, a discrete approximation of the continuous scale-space L is used while best preserving these properties. This discrete scale-space is defined as: $L_d(t) = \Psi_\rho(\sigma(t-1)) * L_d(t-1)$, where $L_d(0) = I$, $t \in \mathbb{N}_0$ denotes the discrete scale-level, $\sigma$ represents a scale-dependent smoothing function, and $\Psi_\rho$ denotes a signal operator that reduces the spatial resolution with factor $\rho$ using down-sampling.

Assuming without loss of generality a discrete scale-space of M scale levels and $\rho=2$, embodiments of the present invention search for anatomical landmarks in a medical image using a navigation model across the M scales, starting with from coarsest scale-level (t=M−1) and ending with the finest scale-level (t=0). According to an advantageous embodiment, for a given anatomical landmark, each scale-space is searched by iteratively approximating an optimal action value function Q* for a current state s using a learned model θ and applying an action a based on the approximated optimal action value function. For this, the optimal action value function Q* is redefined by conditioning the state-representation s and model parameters θ on the scale-space $L_d$ and the current scale $t \in [0, \ldots, M-1]$: $Q^*(s, a | L_d, t) \approx Q(s, a; \theta_t | L_d, t)$. This results in M independent navigation sub-models $\theta = [\theta_0, \theta_1, \ldots, \theta_{M-1}]$, one for each scale-level. In an advantageous embodiment, the respective navigation sub-model for each scale-level is a deep neural network (DNN) trained at that scale level using deep reinforcement learning (DRL), i.e., the navigation sub-models are trained by optimizing the Bellman criterion on each scale-level t<M. Additional details regarding training a model for landmark detection using DRL are described in U.S. Publication No. 2017/0103532, entitled "Intelligent Medical Image Landmark Detection," and U.S. Publication No. 2017/0116497, entitled "Intelligent Multi-scale Medical Image Landmark Detection," the disclosures of which are incorporated herein in their entirety by reference. In order to search for the landmark in a given scale-level t, a state-representation s representing a current location of the landmark search at that scale-level is input to the trained DNN $\theta_t$ for that scale-level, the trained DNN calculates action values (Q-values) for a defined set of actions (e.g., left, right, up, down, front, back), and an action with the highest Q-value is selected and applied to move the current location. These operations are repeated until the landmark search at that scale-level converges (or for a predetermined maximum number of iterations).

The multi-scale detection workflow for each anatomical landmark is performed as follows: the search starts in the image center at the coarsest scale level M−1. Upon convergence of the search at the coarsest scale-level M−1, the scale-level is changed to M−2 and the search continues from the convergence point determined at M−1. The same process is repeated at the following scales until convergence on the finest scale t=0. The present inventors have empirically observed that optimal trajectories converge on minimal oscillatory cycles. As such, in an advantageous implementation, the convergence point can be defined as the center of gravity of this cycle. The search-model for the coarsest scale-level $Q(.,.; \theta_{M-1} | L_d, M-1)$ is trained for global convergence (i.e., convergence over the entire reduced resolution image at that scale), while the models for each of the subsequent scales t<M−1 are trained in a constrained range around the ground-truth. This range may be robustly estimated from the accuracy upper-bound on the previous scale t+1. Note that the spatial coverage of a fixed-size state $s \in S$ increases exponentially with the scale. This multi-scale navigation model allows the system to effectively exploit the image information and increase the robustness of the search.

According to an advantageous embodiment of the present invention, the global search model $\theta_{M-1}$ (i.e., the search model for the coarsest scale-level) is explicitly trained for missing landmarks in order to further improve the accuracy for such cases. In particular, the global search model $\theta_{M-1}$ is trained to reward trajectories that leave the image space through the correct image/volume border when the landmark being searched for is missing in the field of view in the training data. For example, assuming that computed tomography (CT) scans are cut only horizontally, the global search model $\theta_{M-1}$ is trained to reward trajectories that leave the image space through the top border or the bottom border depending on whether the missing landmark in the training data is above or below the field of view. In order to perform this training, an annotation is required for each missing landmark in the training data indicating whether the missing landmark is above the field of view or below the field of view.

Figure 1:
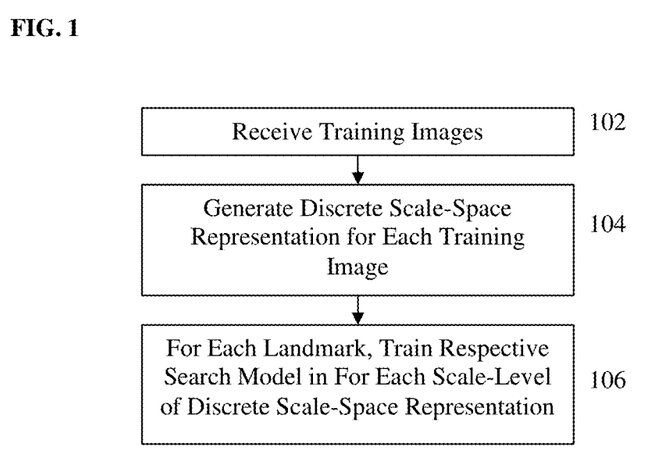
FIG. 1 illustrates a method of training an intelligent multi-scale navigation model for anatomical landmark detection according to an embodiment of the present invention.

FIG. 1 illustrates a method of training an intelligent multi-scale navigation model for anatomical landmark detection according to an embodiment of the present invention. The intelligent multi-scale navigation model trained using the method of FIG. 1 includes trained search models for a plurality of scale-levels (spatial resolutions) for one or more anatomical landmarks. The method of FIG. 1 is performed in an offline training phase prior to performing online detection of anatomical landmarks in newly received/acquired medical images using the trained multi-scale navigation model.

Referring to FIG. 1, at step 102, training images are received. The training images can be received by loading a plurality of training images from a database. In an advantageous implementation, the training images are 3D medical images (volumes) in order to train the intelligent multi-scale navigational model for 3D anatomical landmark detection, but the present invention is not limited thereto and the training images may also be 2D images. It is to be understood that the training images can be n-dimensional, as there is no limitations as the number of dimensions. The training images can be medical images acquired using any medical imaging modality, such as but not limited to Computed Tomography (CT), Magnetic Resonance Imaging (MRI), Ultrasound, DynaCT, Positron Emission Tomography (PET), PET-CT, MR-PET, X-ray, etc. The training images are each annotated with ground truth locations for a set of N landmarks. If a given landmark is missing from a given training image (outside the field of view), the annotation of that training image for the missing landmark indicates which direction (e.g., above or below) the missing landmark is in relation to the field of view of the training image. The training images may include medical images from scans having different fields of view. For example, the training images may include full body scans, partial body scans, and other variable scan ranges. In an advantageous embodiment, additional training samples may be generated from the received training images by cropping received training images to generate images with multiple different fields of view. This can provide a more robust set of training data with different landmarks missing from various training examples. The set of N anatomical landmarks can include various anatomical landmarks that can be used for image navigation and/or image parsing. For instance, in an exemplary implementation, the set of anatomical landmarks for which ground truth locations are annotated in the training data can include the left kidney, right kidney, left hip bone, right hip bone, left common carotid, brachiocephalic artery, left subclavian artery, and bronchial bifurcation, but the present invention is not limited to this specific set of anatomical landmarks.

At step 104, a discrete scale-space representation is generated for each training image. The discrete scale-space representation for a training image I is defined as: $L_d(t)=\Psi_\rho(\sigma(t-1))*L_d(t-1)$, where $L_d(0)=I$, $t\in \mathbb{N}_0$ denotes the discrete scale-level, $\sigma$ represents a scale-dependent smoothing function, and $\Psi_\rho$ denotes a signal operator that reduces the spatial resolution with factor $\rho$ using down-sampling. Accordingly, generating the discrete scale-space representation for a training image I results an image pyramid of M images $L_d(0)$, $L_d(1)$, ..., $L_d(M-1)$, where $L_d(0)$ is the original training image I and $L_d(1)$, ..., $L_d(M-1)$ are reduced resolution image at different spatial resolutions (scale-space levels). In an exemplary implementation $\rho=2$, but the present invention is not limited thereto. For example, a scale-space of 4 scale-levels (M=4) can be used with isotropic resolutions of 2 mm, 4 mm, 8 mm, and 16 mm defined for the respective scale-levels.

At step 106, for each landmarks, a respective search model is trained for each of the scale-levels (t=0, 1, ..., M−1) in the discrete scale-space. That is, for each of the N anatomical landmarks in the set of anatomical landmarks, M search models are trained, each trained to search for the anatomical landmark in a respective one of the M scale-levels (resolutions). In an advantageous embodiment of the present invention, each of the M search models for a given anatomical landmark is a DNN trained based on the training data at the respective scale-level using DRL. A method for training a DNN-based search model θ for a particular anatomical landmark using DRL is described herein. It is to be understood that, other than where specific differences between training the search models for the different scale-levels are noted, the training method can be similarly applied to train the search model at each of the scale-levels. Additional details regarding training a model for landmark detection using DRL are described in U.S. Publication No. 2017/0103532, entitled "Intelligent Medical Image Landmark Detection," and U.S. Publication No. 2017/0116497, entitled "Intelligent Multi-scale Medical Image Landmark Detection," the disclosures of which are incorporated herein in their entirety by reference.

In an advantageous implementation, the trained DNN can be a deep convolutional neural network (CNN). Inspired by the feed-forward type of information processing observable in the early visual cortex, the deep CNN represents a powerful representation learning mechanism with an automated feature design, closely emulating the principles of animal and human receptive fields. The architecture of the deep CNN is comprised of hierarchical layers of translation-invariant convolutional filters based on local spatial correlations observable in images. Denoting the l-th convolutional filter kernel in the layer k by $w^{(k,l)}$, the representation map generated by this filter can be expressed as: $o_{i,j}=\sigma((w^{(k,l)}*x)_{i,j}+b^{(k,l)})$, where x denotes the representation map from the previous layer (used as input), (i,j) define the evaluation location of the filter and $b^{(k,l)}$ represents the neuron bias. The function a represents the activation function used to synthesize the input information. In an exemplary implementation, rectified linear unit activations (ReLU) can be used given their excellent performance. In a supervised training setup, i.e., given a set of independent observations as input patches X with corresponding value assignments y, the network response function can be defined as R(.; w,b) and Maximum Likelihood Estimation can be used to estimate the optimal network parameters: $\hat{w}, \hat{b}=\text{argmin}_{w,b}\|R(X; w, b)-y\|_2^2$. This optimization problem can be solved using a stochastic gradient descent (SGD) approach combined with the backpropagation algorithm to compute the network gradients.

Reinforcement learning (RL) is a technique aimed at effectively describing learning as an end-to-end cognitive process. A typical RL setting involves an artificial agent that can interact with an uncertain environment, thereby aiming to reach predefined goals. The agent can observe the state of the environment and choose to act on it, similar to a trial-and-error search, maximizing the future reward signal received as a supervised response from the environment. This reward-based decision process is modeled in RL theory as a Markov Decision Process (MDP), $\mathcal{M}:=(S, A, T, R, \gamma)$, where S represents a finite series of states over time, A represents a finite series of actions allowing the agent to interact with the environment, $T:S\times A\times S\rightarrow[0,1]$ is a stochastic transition function, where $T_{s,a}{}^{s'}$ describes the probability of arriving in state s' after performing action a in state s, $R:S\times A\times S$ is a scalar reward function, where $R_{s,a}{}^{s'}$ denotes the expected reward after a state transition, and $\gamma$ is the discount factor controlling future versus immediate rewards.

Formally, the future discounted reward of an artificial agent at time $\hat{t}$ can be written as $R_{\hat{t}} = \sum_{t=\hat{t}}^{T} \gamma^{t-\hat{t}} r_t$, with $\mathcal{T}$ marking the end of a learning episode and $r_t$ defining the immediate reward the agent receives at time $t$. Especially in model-free reinforcement learning, the target is to find the optimal so called action-value function, denoting the maximum expected future discounted reward when starting in state s and performing action a: $Q^*(s, a) = \max_\pi \mathbb{E}[R_t|s_t=s, a_t=a, \pi]$, where $\pi$ is an action policy, in other words a probability distribution over actions in each given state. Once the optimal action-value function is estimated, the optimal action policy, determining the behavior of the artificial agent, can be directly computed in each state: $\forall s \in S$: $\pi^*(s) = \arg\max_{a \in A} Q^*(s, a)$. One important relation satisfied by the optimal action-value function $Q^*$ is the Bellman optimality equations, which is defined as:

$$Q^*(s,a) = \Sigma_{s'} T_{s,a}{}^{s'}(R_{s,a}{}^{s'} + \gamma \max_{a'} Q^*(s',a')) = \mathbb{E}_{s'}(R + \gamma \max_{a'} Q^*(s',a')) \quad (1)$$

where s' defines a possible state visited after s, a' the corresponding action, and $r = R_{s,a}{}^{s'}$ represents a compact notation for the current, immediate reward. Viewed as an operator $\tau$, the Bellman equation defines a contraction mapping. Strong theoretical results show that by applying $Q_{i+1} = \tau(Q_i)$, $\forall(s, a)$, the function $Q_i$ converges to $Q^*$ at infinity. This model-based policy iteration approach is however not always feasible in practice. An alternative is the use of model-free temporal difference methods, such as Q-learning, which exploit correlations of consecutive states. The use of parametric functions to approximate the Q-function provides a step further toward higher computational efficiency. Considering the expected non-linear structure of the Q-function, neural networks represent a potentially powerful solution for policy approximation. According to an advantageous embodiment of the present invention, deep neural networks are leveraged to approximate the Q-function (at each scale-level) in order to provide automated machine-driven intelligence for landmark detection in medical images.

According to an advantageous embodiment, the landmark detection problem is formulated as a deep-learning driven behavior policy encoding automatic, intelligent paths in parametric space toward the correct solution. In particular, for the landmark detection problem, the optimal search policy represents a trajectory in image space (at the respective scale-level) converging to the landmark location $p \in \mathbb{R}_+^d$ (d is the image dimensionality). The reward-based decision process for determining the trajectory to the landmark location is modeled with an MDP $\mathcal{M}$. While the system dynamics T are implicitly modeled through the deep-learning-based policy approximation, the state space S, the action space A, and the reward/feedback scheme are explicitly designed for the landmark detection problem. The states describe the surrounding environment. According to an advantageous implementation, the state for the landmark detection search model is defined as a region-of-interest in the image (at the given scale-level) with its center representing the current position of the agent (i.e., the current estimate for the landmark location). The actions denote the moves of the artificial agent in the parametric space. According to an advantageous implementation, a discrete action scheme can be selected allowing the agent to move a predetermined distance (i.e., one pixel/voxel) in all directions: up, down, left, right, front, back, corresponding to a shift of the image patch. This allows the agent to explore the entire image space (for the global search model at scale level M−1) or the entire search space of the constrained search regions (for the search models at the remaining scales). The rewards encode the supervised feedback received by the agent. As opposed to typical reward choices for RL problems, embodiments of the present invention follow more closely to a standard human learning environment, where rewards are scaled according to the quality of a specific move. In an advantageous implementation, the reward is selected to be $\delta d$, the supervised relative distance change to the ground truth landmark location after executing an action.

Figure 2:
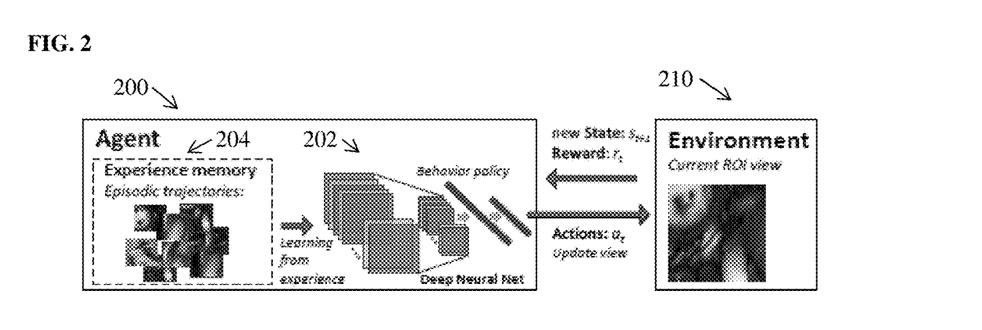
FIG. 2 illustrates an exemplary search model for anatomical landmark detection in a medical image according to an embodiment of the present invention.

FIG. 2 illustrates an exemplary search model for anatomical landmark detection in a medical image according to an embodiment of the present invention. As illustrated in FIG. 2, the search model acts as an intelligent artificial agent 200 that interacts with an environment 210. A deep neural network 202 is trained to learn a reward behavior policy. The trained deep neural network 202 inputs a current state $S_t$, which is a current ROI view centered at a current estimated landmark location, and estimates a reward function $r_t$ that includes an action value for each action in the set of actions. An action $a_t$ having the highest action value (Q-value) is selected and applied to move the current ROI, which results in a next state $s_{t+1}$. The next state $s_{t+1}$ is then input to the deep neural network 202 and the process is iterated until a stop condition (e.g., convergence, maximal number of iterations) is met.

Deep reinforcement learning is used to train the intelligent artificial agent. Given the model definition, the goal of the agent is to select actions by interacting with the environment in order to maximize the cumulative future reward. The optimal behavior is defined by the optimal policy $\pi^*$ and implicitly optimal action value function $Q^*$. In an advantageous implementation, a model-free, temporal difference approach using a deep convolutional neural network (CNN) can be used to approximate the optimal active-value function $Q^*$. Defining the parameters of a deep CNN as $\theta$, this architecture can be used as a generic, non-linear function approximator $Q(s, a; \theta) \approx Q^*(s, a)$, referred to herein as a deep Q network (DQN). A deep Q network can be trained in this context using an iterative approach to minimize a mean squared error based on the Bellman optimality criterion (see Equation 1). At any learning iteration i, the optimal expected target values can be approximated using a set of reference parameters $Q_i^{ref} := \theta_j$ from a previous iteration $j < i : y = r + \gamma \max_a Q(s', a'; \theta_i^{ref})$. As such, a sequence of well-defined optimization problems driving the evolution of the network parameters is obtained. The error function at each step i is defined as:

$$\hat{\theta}_i = \arg\min_{\theta_i} \mathbb{E}_{s,a,r,s'}[(y - Q(s,a;\theta_i))^2] + \mathbb{E}_{s,a,r} \mathbb{V}_{s'}[y]]. \quad (2)$$

Using a different network to compute the reference values for training can bring robustness to the algorithm. In such a setup, changes to the current parameters $\theta_i$ and implicitly to the current approximator $Q(.; \theta_i)$ cannot directly impact the reference output y, introducing an update-delay and thereby reducing the probability to diverge and oscillate in suboptimal regions of the optimization space. To ensure the robustness of the parameter updates and train more efficiently, experience replay can be used. In experience replay, the agent stored a limited experience memory (204 of FIG.

2) of previously visited states as a set of explored trajectories: $\varepsilon=[t_1, t_2, \ldots t_p]$. This memory is constantly sampled randomly to generate mini-batches guiding the robust training of the CNN and implicitly the agent behavior policy.

For each anatomical landmark to be detected, the above described training algorithm is used to train a respective search model $\theta_t$ for each of the scale-levels t=0, 1, ... M−1. The search-model for the coarsest scale-level $Q(.,.; \theta_{M-1}|L_d, M-1)$ is trained for global convergence (i.e., convergence over the entire reduced resolution image at that scale), while the models for each of the subsequent scales t<M 1 are trained in a constrained range around the ground-truth. This range may be robustly estimated from the accuracy upper-bound on the previous scale t+1. According to an advantageous embodiment of the present invention, the global search model $\theta_{M-1}$ (i.e., the search model for the coarsest scale-level) is explicitly trained for missing landmarks in order to further improve the accuracy for such cases. In particular, the global search model $\theta_{M-1}$ is trained to reward trajectories that leave the image space through the correct image/volume border when the landmark being searched for is missing in the field of view in the training data. Once the trained search models for each landmark are trained, the trained search models can be stored, for example on a memory or storage of a computer system or on a remote cloud-based storage device, and used to perform automated computer-based landmark detection in a newly received medical image.

Figure 3:
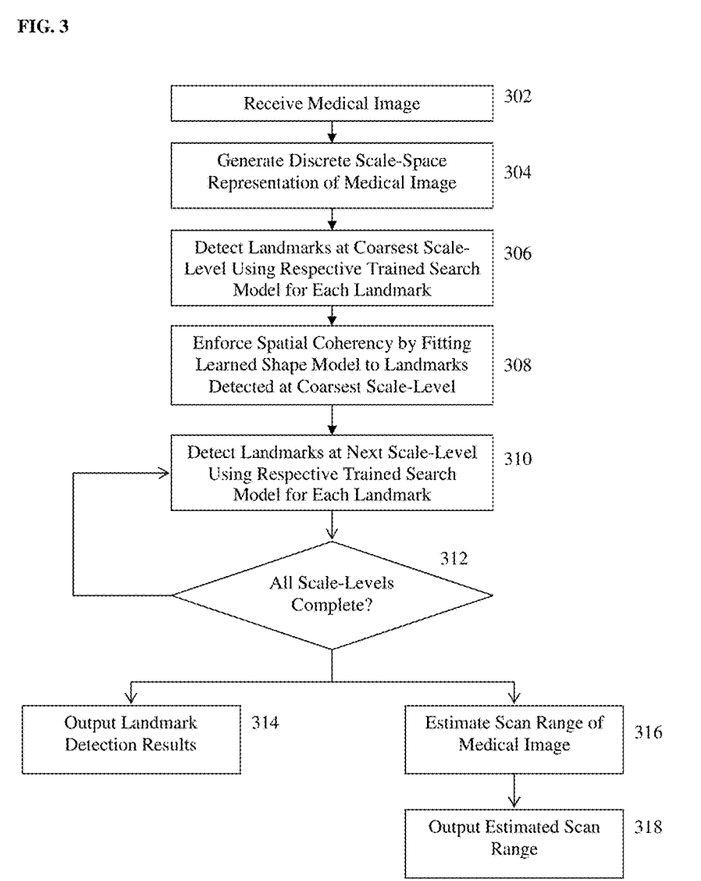
FIG. 3 illustrates a method for automated computer-based multi-scale anatomical landmark detection in medical images according to an embodiment of the present invention.

FIG. 3 illustrates a method for automated computer-based multi-scale anatomical landmark detection in medical images according to an embodiment of the present invention. The method of FIG. 3 utilizes trained search models using the method of FIG. 1 to detect a set of anatomical landmarks in a medical image of a patient. At step 302, a medical image of a patient is received. The medical image can be a 2D, 3D, or n-D medical image and can be acquired using any type of medical imaging modality, such as but not limited to CT, MRI, ultrasound, X-ray fluoroscopy, DynaCT, etc. The medical image can be received directly from an image acquisition device, such as a CT scanner, MRI scanner, etc. Alternatively, the medical image can be received by loading a previously acquired medical image of the patient from a memory or storage of a computer system or can be received as an electronic transmission from a remote computer system.

At step 304, a discrete scale-space representation is generated for the medical image. The discrete scale-space representation for the received medical image I is defined as: $L_d(t)=\Psi_\rho(\sigma(t-1))*L_d(t-1)$, where $L_d(0)=I$, $t \in \mathbb{N}_0$ denotes the discrete scale-level, $\sigma$ represents a scale-dependent smoothing function, and $\Psi_\rho$ denotes a signal operator that reduces the spatial resolution with factor $\rho$ using down-sampling. Accordingly, generating the discrete scale-space representation for the medical image I results an image pyramid of M images $L_d(0), L_d(1), \ldots, L_d(M-1)$, where $L_d(0)$ is the original resolution medical image I and $L_d(1), \ldots, L_d(M-1)$ are reduced resolution images at different spatial resolutions (scale-space levels) generated by down-sampling the medical image. In an exemplary implementation $\rho=2$, but the present invention is not limited thereto. For example, a scale-space of 4 scale-levels (M=4) can be used with isotropic resolutions of 2 mm, 4 mm, 8 mm, and 16 mm defined for the respective scale-levels.

At step 306, a set of anatomical landmarks are detected at the coarsest scale-level of the scale-space representation of the medical image using a respective trained search model for each landmark. For each anatomical landmark, a plurality of search models, each corresponding to a respective scale-level (i.e., spatial resolution) of the discrete scale-space representation, are trained in an offline training stage using the method of FIG. 1. As described above, each search model uses a trained deep neural network (DNN) to calculate action values and select actions to search for the landmark in the respective scale-level of the scale-space representation of the medical image. For each landmark, the search model $\theta_{M-1}$ at the coarsest scale-level t=M−1 is a global search model that is trained to perform a global search for the location of that landmark over the coarsest reduced resolution image $L_d(M-1)$ of the discrete scale-space representation. The search for each landmark using the respective coarsest resolution search model $\theta_{M-1}$ can start at the center of the coarsest reduced resolution image $L_d(M-1)$. However, the present invention is not limited to starting at the center of the coarsest reduced resolution image and other starting positions are possible as well. For each landmark, the trained coarsest search model $\theta_{M-1}$ (i.e., trained DNN) for that landmark iteratively predicts a series of actions that predict a path from the starting location (i.e., the center of the coarsest reduced resolution image) to a final estimated landmark location in the coarsest reduced resolution image. At each iteration, a predetermined size region of interest centered at the current location is input to the trained DNN and the trained DNN calculates action-values for each of a plurality of predetermined actions. For example, the actions can be moving the current location by one pixel/voxel up, down, left, right, forward, or backward. The action having the highest action-value is selected and applied. These steps are repeated for a given landmark until the path/trajectory for that landmark converges or until a preset maximum number of iterations is reached. It can be determined that the path/trajectory for a landmark has converged when a loop/oscillatory cycle is detected in the path/trajectory. In this case, the final estimated landmark location for the landmark can be determined to be the center of gravity of the cycle. As described above, the coarsest search model $\theta_{M-1}$ can be trained for missing landmarks by rewarding trajectories that leave the image space through the correct volume border when a landmark is missing from the field-of-view of an image. Accordingly, for a given landmark, the coarsest scale-space search model $\theta_{M-1}$ can predict a trajectory that leaves the field-of-view of the medical image, and thus predicts that the landmark is missing from the medical image. In an exemplary implementation, the set of landmarks to be detected can include the bronchial bifurcation, the aortic arch bifurcations (i.e., the left subclavian artery, left common carotid artery, and the brachiocephalic artery), the center of the left and right kidneys, and the front corner of the left and right hip bones, but the present invention is not limited thereto.

Figure 4:
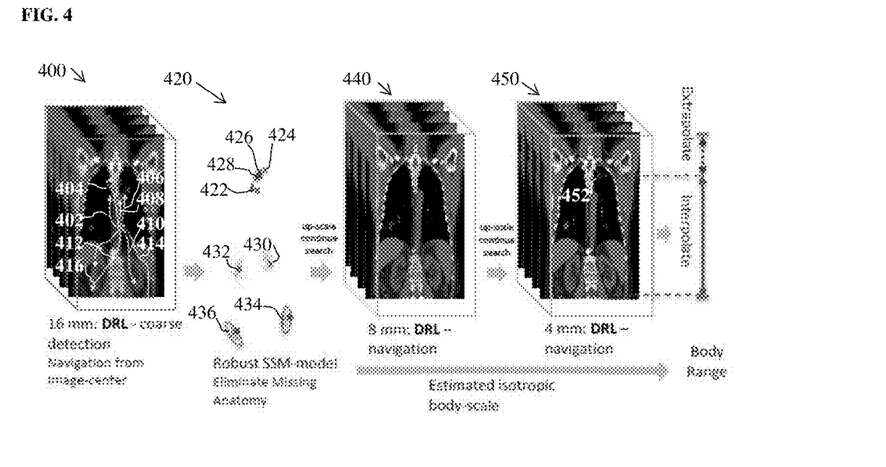
FIG. 4 illustrates exemplary results of the automated multi-scale anatomical landmark detection method of FIG. 3.

FIG. 4 illustrates exemplary results of the automated multi-scale anatomical landmark detection method of FIG. 3. As shown in FIG. 4, image 400 shows results for detecting anatomical landmarks at the coarsest scale-level (t=M−1) of a discrete scale-space representation of a computed tomography (CT) image. In the example of FIG. 4, the coarsest scale-level corresponds to a spatial resolution of 16 mm. In the example of FIG. 4, the set of landmarks to be detected includes the bronchial bifurcation, the left subclavian artery bifurcation, the left common carotid artery bifurcation, the brachiocephalic artery bifurcation, the left kidney (center of the left kidney), the right kidney (center of the right kidney), the left hip (front corner of the left hip bone) and the right hip (front corner of the right hip bone). As shown in image 400, trajectories to estimated landmark locations are predicted at the coarsest scale-level for the bronchial bifurcation 408, left subclavian artery bifurcation 406, left common carotid artery bifurcation 404, brachiocephalic artery bifurcation 402, left kidney 410, right kidney 412, left hip 414, and right hip 416. Each trajectory 402, 404, 406, 408, 410, 412, 414, and 416 is independently predicted by a respective coarsest scale-level search model $\theta_{M-1}$ trained for that landmark. The predicted trajectory for the left hip 414 leaves the field-of-view of the coarsest reduced resolution image 400. This means the coarsest scale-level search model $\theta_{M-1}$ trained for the left hip landmark predicts that the left hip landmark is missing from the field-of-view of the image.

Returning to FIG. 3, at step 308, spatially coherency is enforced for the set of anatomical landmarks by fitting a learned shape model to the anatomical landmarks detected at the coarsest scale-level. This step detects eliminates landmarks missing from the field-of-view of the medical image and detects and corrects outliers in the detected anatomical landmarks. To ensure the robust recognition of missing anatomical structures and outliers, the spatial distribution of the set of considered anatomical landmarks can be modeled using robust statistical shape modeling. This step constrains the output of landmarks detected at the coarsest scale-level by the global search model $\theta_{M-1}$ for each landmark. A statistical shape model of the spatial distribution of the set of anatomical landmarks is learned in an offline training stage from a set of training images. Assuming a complete set of N anatomical landmarks, the distribution of these landmark points over the complete set of training images is normalized to zero mean and unit variance. In this space, the distribution of each individual landmark $i \in [0, \ldots, N-1]$ can be modeled as a multi-variate normal distribution $p_i \sim \mathcal{N}(\mu_i, \Sigma_i)$, where $\mu_i$ and $\Sigma_i$ are estimated using maximum likelihood. This defines a mean shape-model for the landmark set, defined as $\mu = [\mu_0, \mu_1, \ldots, \mu_{N-1}]^T$.

Given an unseen configuration of detected landmark points at scale M-1 as $\tilde{P} = [\tilde{p}_0, \tilde{p}_1, \ldots, \tilde{p}_{N-1}]$, the set of detected landmark points $\hat{P}$ can be approximated with a translated and anisotropic-scaled version of the mean model using least linear squares. However, for the case of incomplete data the cardinality of $|\hat{P}| \leq N$. In addition outliers can corrupt the data. According to an advantageous implementation, an M-estimator sample consensus can be used enable the robust fitting of the shape model to the set of landmarks detected at the coarsest scale-level. Based on random 3-point samples from the set of all triples (i.e., the set of all possible combinations of three of the landmark points), the mean-model fit $\hat{\omega} = [t, s]$ can be obtained, where t and s are the translation and scaling parameters to fit the mean shape model to the detected landmarks. The target is to optimize the cost function based on the re-descending M-estimator and implicitly maximize the cardinality of the consensus set. In an advantageous implementation, the following cost function can be used:

$$\hat{S} \leftarrow \arg\min_{S \in I_3(P)} \sum_{i=0}^{|P_i|} \min\left[\frac{1}{Z_i}(\phi(\tilde{p}_i) - \mu_i)^T \Sigma_i^{-1}(\phi(\tilde{p}_i) - \mu_i), 1\right]$$

The target is to minimize this cost function (based on the redescending M-estimator) which results in maximizing the cardinality of the consensus set S. $Z_i$ is a normalization factor for the distance-based sample score which defines an ellipsoid around the mean landmark location. If a detected landmark is within the ellipsoid, it is considered an inlier and part of the consensus set (with cost <1), if outside, it is an outlier (with fixed cost 1). Standard random sampling is used to select the minimum set of 3 detected landmark points required to fit the model with linear least squares. Given a fitted model, the cost function is evaluated with the aim to maximize the size of the consensus set. This results in a robust set of landmarks $\hat{P}$ that are present in the field-of-view of the medical image with missing landmarks eliminated from the initial set of landmarks to be detected and spatially coherent locations of the set of landmarks $\hat{P}$ in the coarsest scale-level that are used to constrain the search for the set of landmarks $\hat{P}$ at the next scale-level. Enforcing spatial coherency by fitting the learned shape model not only corrects for diverging trajectories by re-initializing the search, but also significantly reduces the false-negative rate by correcting for border cases, in which landmarks very close to the border of the image (e.g., <2 cm) are falsely labeled as missing by the search model at the coarsest scale M-1.

Referring to FIG. 4, image 420 shows results of fitting the learned mean-shape model to the landmarks detected at the coarsest scale in image 400. The mean-shape model fit the landmarks detected in image 400 results in predicted landmark locations in the field-of-view of the medical image for the bronchial bifurcation 422, left subclavian artery bifurcation 424, left common carotid artery bifurcation 426, brachiocephalic artery bifurcation 428, left kidney 430, and right kidney 432. Given the detected locations of the landmarks in image 400, a translated and isotropically scaled version of the mean model is fitted as described above, resulting in the landmark locations shown in image 420. The shape model predicts a range of locations for the left and right hip landmarks 434 and 436, respectively. Since the range of locations for the left and right hip landmarks 434 and 436 predicted by the learned shape model fit to the detected landmarks are outside of the field of view of the coarsest reduced resolution image 400, the left and right hip landmarks are determined to be missing from the field-of-view of the medical image and excluded from the set of landmarks $\hat{P}$ detected at the remaining scale levels. Note that since the trajectory to the left hip landmark 434 (414 in image 400) is going outside the image, that landmark is not used to fit the shape-model. The landmark locations for the bronchial bifurcation 422, left subclavian artery bifurcation 424, left common carotid artery bifurcation 426, brachiocephalic artery bifurcation 428, left kidney 430, and right kidney 432 at the coarsest scale-level (t=M-1) are used to constrain the search for those landmarks at the next scale-level (t=M-2).

Returning to FIG. 3, at step 310, anatomical landmarks are detected at the next scale-level of the scale-space representation of the medical image using a respective trained search model for each landmark. At this step the search moves to the next scale-level of the scale-space representation (i.e., t=t-1), and the set of landmarks $\hat{P}$ defined in step 308 is detected at the next scale-level using a respective search model $\theta_t$ trained for the next scale-level for each landmark. As described above, each search model $\theta_t$ uses a trained DNN to predict action-values for a set of actions and iteratively selects actions to predict a trajectory/path from a starting location (given by the estimated location at the previous scale-level) to an estimated landmark location at the particular scale-level. The search for each landmark by the respective search model $\theta_t$ is constrained to a range surrounding the estimated landmark location at the previous scale-level. The first time step 310 is performed (for scale-level M-2), the search for each landmark by the respective search model $\theta_{M-2}$ is constrained by the landmark locations in the shape model fit to the detected landmarks at the coarsest scale level in step 308. The range in each scale-level can be robustly estimated from the accuracy of the upper-bound on the previous scale-level t+1.

At step 312, it is determined if the landmark detection at the final scale-level (t=0) of the scale-space representation of the medical image has been completed. If the landmark detection at the final scale-level (t=0) has not yet been completed, the method returns to step 310, moves to the next scale-level and detects anatomical landmarks at the next scale-level using search models for the anatomical landmarks trained for the next-scale level. Accordingly, the method sequentially performs landmark detection at each scale-level going from coarse to fine resolutions until the landmark detection at the final scale-level (t=0) corresponding to the original resolution medical image is performed. When the landmark detection at the final scale-level (t=0) has been completed, the method proceeds to steps 314 and 316. Referring to FIG. 4, images 440 and 450 show landmark detection results at the scale-levels of 8 mm resolution and 4 mm resolution respectively.

Returning to FIG. 3, at step 314 the landmark detection results are output. In particular, the detected locations of the landmarks in the set of landmarks P in the original resolution medical image (i.e., the final scale-level t=0) are output. These landmark locations can be output by displaying, on a display device of a computer system, a visualization of the medical image with markers indicating the detected landmark locations displayed at the detected locations in the visualization of the medical image. For landmarks included in the original set of landmarks to be detected, but not included in the set of landmarks $\hat{P}$ defined in step 308, an indication that these landmarks are missing from the field-of-view of the medical image can be output, for example by being displayed on a display device of computer system.

At step 316, a scan range of the medical image can be automatically determined based on the detected anatomical landmarks. The robust fitting of the shape-model also enables the estimation of the body-region captured in the medical image scan. The learned shape model of the spatial distribution of the set of landmarks can be used to model of continuous range along a normalized z-axis (i.e., along a length of the human body), to ensure consistency among different patients. For a set of defined landmarks P in a normalized shape-space, the point $p_{min}^z$ determines the 0% point, while the point $p_{max}^z$ determines the 100% point. For a given set of landmarks to be detected $\tilde{P}$, the fitted robust subset of landmarks (defined in step 308) is represented by $\hat{P} \subseteq \tilde{P}$. Using the definition of the range based on the shape-space of the landmark points, the span of the point-set $\tilde{P}$ can be determined between 0%-100% in the normalized shape-space. This also allows the linear extrapolation of the body-range outside the z-span of the point set $\tilde{P}$ in the medical image. That is, the body range between detected locations of $p_{min}^z$ and $p_{max}^z$ in the medical image is interpolated between 0%-100%. The body range above $p_{max}^z$ and below $p_{min}^z$ in the medical image are linearly extrapolated above 100% and below 0%, respectively. When $p_{min}^z$ or $p_{max}^z$ is missing from the field-of-view of the medical image, the interpolation is performed to the bottom or top border of the medical image based on the locations of the landmarks in $\hat{P}$.

In an exemplary implementation, for the set of landmarks including bronchial bifurcation, left subclavian artery bifurcation, left common carotid artery bifurcation, brachiocephalic artery bifurcation, left kidney, right kidney, left hip bone corner, and right hip bone corner, the continuous body range model can be defined based on the set of landmarks in the training data with the left hip bone (LHB) corner at 0% and the left common carotid artery (LCCA) bifurcation at 100%. The levels of the remaining landmarks are determined in the normalized shape-space using linear interpolation. When applied to a newly received medical image based on a set of detected landmarks, each detected landmark is assigned the corresponding body range level as in the learned body range model, interpolation is performed between the landmarks, and extrapolation is performed above LCCA bifurcation and/or below the LHB corner. In the example of FIG. 4, since the LHB coroner landmark is missing from the scan range of the medical image, the scan range (body range) of the medical image is determined by interpolation along the z-axis between the LCCA bifurcation landmark location 452 detected at the final scale-level and the lower border of the medical image based on the landmark locations detected at the final scale-level. The scan range (body range) of the medical image above the LCCA bifurcation is determined by linear extrapolation along the z-axis between the LCCA bifurcation landmark location 452 detected at the final scale-level and the upper border of the medical image. The scan range of the medical image in the example of FIG. 4 extends from 21.3% to 109%.

Returning to FIG. 3, at step 318, the estimated scan-range is output. The estimated scan-range can be output by displaying the estimated scan-range on a display device of a computer system. The estimated scan-range can also be output by labeling the medical image scan with the scan range and/or storing the scan-range associated with the medical image scan in a storage or memory of a computer system. The scan-range can be output by outputting the numerical scan range determined in step 316. In addition, body labels can be automatically associated with the numerical values determined for the scan range and the body labels describing the scan range can be output as well.

In an exemplary implementation of the methods of FIGS. 1 and 3, a scale-space of 4 scales was defined at isotropic resolutions of 2 mm, 4 mm, 8 mm, and 16 mm. The set of landmarks detected included the bronchial bifurcation, left subclavian artery bifurcation, left common carotid artery bifurcation, brachiocephalic artery bifurcation, left kidney, right kidney, left hip bone corner, and right hip bone corner. For the kidney center (left and right), the fine resolution was set to 4 mm, given the higher variability of the annotations in the training data. For each scale and landmark, the network structure of the DNN was the same: convolutional layer (40 kernels: 5×5×5, rectified linear unit (ReLU)), pooling (2×2×2), convolutional layer (58 kernels: 3×3×3), pooling (2×2×2), and four fully connected layers (512× 256×6 units, ReLU). The following meta-parameters for training were also shared across scales and landmarks: training iterations (750), episode length (1500), replay-memory size (100000), learning rate (0.0005), batch-size (128), and discount factor (0.9). The dimensionality of the state (ROI input to the DNN) was also fixed across scales to 25×25×25 voxels. As described above, on all scales except M−1, the training is performed in a constrained range around the ground-truth $p_{GT}$±r. Depending on scale and landmark: $r \in [-12, +12]^3$ voxels.

Given the trained multi-scale models for each landmark $\Theta_0, \Theta_1, \ldots, \Theta_N$ (N=8 in the exemplary implementation), the search starts on the lowest (coarsest) scale in the center of the scan. Let $\tilde{P}$ be the output of the navigation sub-models (search models) on the coarsest scale. Robust shape-model fitting was performed on $\tilde{P}$ to eliminate outliers and correct for miss-aligned landmarks, resulting in a robust set of landmarks $\hat{P}$. This reduced the false positive (FP) and false negative (FN) rates from around 2.5% to under 0.5%. Applying the training range r to constrain the navigation of the subsequent scale-levels [M−2, . . . , 0], it was empirically observed that the shape-constraint was preserved and both the FP and FN rates were reduced to zero.

Figure 5:
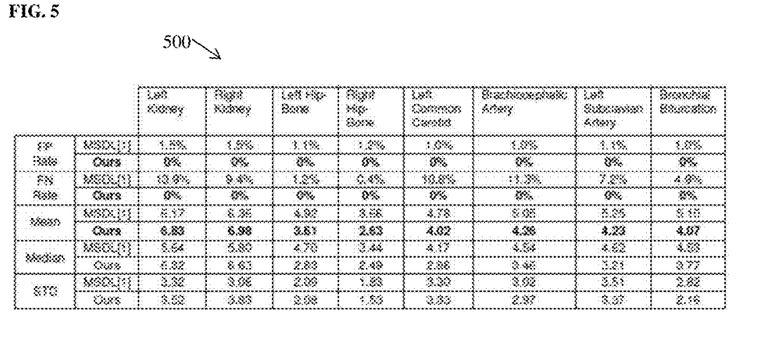
FIG. 5 illustrates a comparison of landmark detection results obtained using the method of FIG. 3 and Marginal Space Deep Learning (MSDL)

The present inventors compared the method described herein to a previous landmark detection technique of Marginal Space Deep Learning (MSDL). MSDL uses a cascade of sparse deep neural networks to scan the complete image space. Missing structures are detected in MSDL using a fixed cross-validated threshold on the hypothesis-probability. The operating point was selected to maintain a FP-rate of less than 1.5%. FIG. 5 illustrates a comparison of landmark detection results obtained using the method of FIG. 3 and MSDL. As shown in FIG. 5, table 500 compares the false positive (FP) rate, false negative (FN) rate, mean error, median error, and standard deviation (STD) of the error for detection of the left kidney, right kidney, left hip-bone, right hip-bone, left common carotid artery bifurcation, brachiocephalic artery bifurcation, left subclavian artery bifurcation, and bronchial bifurcation using the method of FIG. 3 ("Ours") and Marginal Deep Space Learning ("MSDL"). As can be observed in table 500 of FIG. 5, the method of FIG. 3 significantly outperforms the MSDL method in recognizing the presence/absence of structures (see FP and FN rates). In terms of accuracy, the improvement using the method of FIG. 3 averages 20%-30% on all landmarks except the kidneys. The increased relative performance of the MSDL method on detecting the kidney centers may be explained by the high FN rate as well as the robust candidate aggregation used in the MSDL method, which accounts for the high variability of the kidney center annotations.

For the method of FIG. 3, learning the multi-scale search trajectory leads to a runtime for anatomical landmark detection fast enough for real-time detection. With an average speed of 35-40 ms per landmark, the method described herein is 15-20 times faster than the MSDL method, which achieved and average speed of around 0.8 seconds. The capability to reliably detect landmarks in real-time in incomplete 3D medical images, such as CT, MR, Ultrasound, PET-CT, MR-PET, etc., opens new possibilities and applications for medical images, starting from the image formation process, inside the scanner, to fast image analysis/diagnosis used in trauma scans (when time is of the essence), and image-based guidance applications in the operating room.

Figure 6:
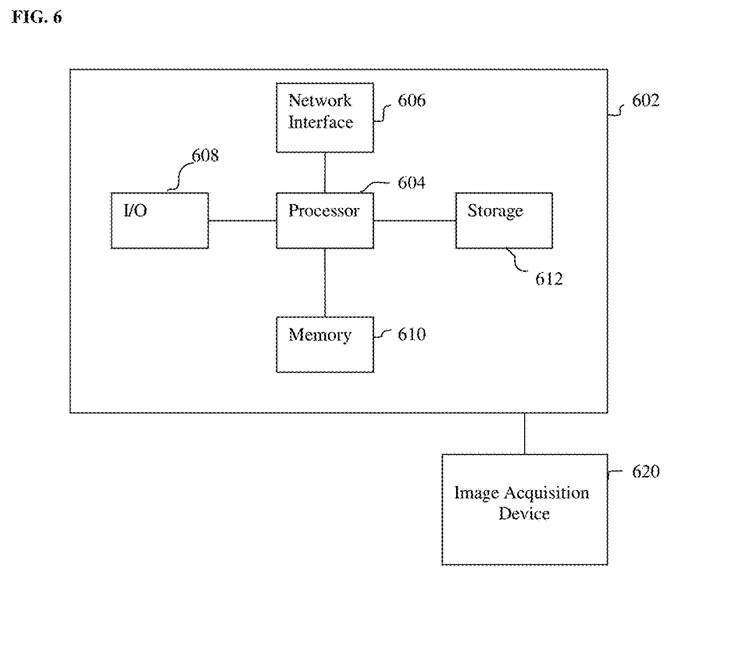
FIG. 6 is a high-level block diagram of a computer capable of implementing the present invention.

The above-described methods for training an intelligent multi-scale navigation model for anatomical landmark detection and automated computer-based multi-scale anatomical landmark detection in medical images can be implemented on a computer using well-known computer processors, memory units, storage devices, computer software, and other components. A high-level block diagram of such a computer is illustrated in FIG. 6. Computer 602 contains a processor 604, which controls the overall operation of the computer 602 by executing computer program instructions which define such operation. The computer program instructions may be stored in a storage device 612 (e.g., magnetic disk) and loaded into memory 610 when execution of the computer program instructions is desired. Thus, the steps of the methods of FIGS. 1 and 3 may be defined by the computer program instructions stored in the memory 610 and/or storage 612 and controlled by the processor 604 executing the computer program instructions. An image acquisition device 620, such as an MR scanning device, CT scanning device, ultrasound device, x-ray image acquisition device, etc., can be connected to the computer 602 to input image data to the computer 602. It is possible to implement the image acquisition device 620 and the computer 602 as one device. It is also possible that the image acquisition device 620 and the computer 602 communicate wirelessly through a network. In a possible embodiment, the computer 602 may be located remotely from the image acquisition device 620, and the computer 602 may perform method steps as part of a server or cloud based service. The computer 602 also includes one or more network interfaces 606 for communicating with other devices via a network. The computer 602 also includes other input/output devices 608 that enable user interaction with the computer 602 (e.g., display, keyboard, mouse, speakers, buttons, etc.). Such input/output devices 1508 may be used in conjunction with a set of computer programs as an annotation tool to annotate volumes received from the image acquisition device 620. One skilled in the art will recognize that an implementation of an actual computer could contain other components as well, and that FIG. 6 is a high level representation of some of the components of such a computer for illustrative purposes.

The foregoing Detailed Description is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that various modifications may be implemented by those skilled in the art without departing from the scope and spirit of the invention. Those skilled in the art could implement various other feature combinations without departing from the scope and spirit of the invention.

The invention claimed is:

1. A method for automated spatially-consistent detection of anatomical landmarks in a medical image of a patient, comprising:
 generating a discrete scale-space representation of a medical image of a patient, wherein the discrete scale-space representation of the medical image includes a plurality of scale-levels;
 detecting a plurality of anatomical landmarks at a coarsest scale-level of the discrete scale-space representation of the medical image using a respective trained search model trained to predict a trajectory from a starting location to a predicted landmark location at the coarsest scale-level for each of the plurality of anatomical landmarks;
 enforcing spatial coherence of the detected anatomical landmarks by fitting a learned shape model of the plurality of anatomical landmarks to the detected anatomical landmarks at the coarsest scale-level to robustly determine a set of the anatomical landmarks within a field-of-view of the medical image; and
 refining the predicted landmark location for each of the landmarks in the set of anatomical landmarks at each remaining scale-level of the discrete scale-space representation of the medical image using, for each landmark in the set of anatomical landmarks, a respective trained search model trained to predict a trajectory to the predicted landmark location at each remaining scale-level, wherein the trained search model for each remaining scale-level for each landmark is constrained based on a range surrounding the predicted landmark location for that landmark at a previous scale-level.

2. The method of claim 1, wherein for each anatomical landmark, the trained search model for each scale-level is an intelligent artificial agent that predicts the trajectory to the predicted landmark location at the corresponding scale-level by iteratively using a trained deep neural network (DNN) that inputs a region of interest surrounding a current location in the corresponding scale-level of the discrete scale-space representation of the medical image to calculate action-values corresponding to actions that move the current location in different direction and selecting an action having the highest action-value to be applied to the current location.

3. The method of claim 2, wherein the discrete scale-space representation of the medical image includes M scale-levels from 0 to M−1, where scale-level 0 of the discrete scale-space representation of the medical image is the medical image at its original resolution and scale-level M−1 is the coarsest scale level, and the trained search model for the coarsest scale level M−1 for each landmark is a global search model that starts the search for the trajectory to the predicted landmark location from the center of the coarsest scale-level of the discrete scale-space representation of the medical image.

4. The method of claim 3, wherein the trained search model for the coarsest scale level M−1 for each landmark is trained to reward trajectories that leave an image space of a training image through a correct image border when the corresponding landmark is missing from the training image.

5. The method of claim 4, wherein detecting a plurality of anatomical landmarks at a coarsest scale-level of the discrete scale-space representation of the medical image using a respective trained search model trained to predict a trajectory from a starting location to a predicted landmark location at the coarsest scale-level for each of the plurality of anatomical landmarks comprises:
for each of the plurality of anatomical landmarks, predicting a trajectory to a predicted landmark location in the coarsest scale-level of the discrete scale-space representation of the medical image or a trajectory that leaves the image space of the discrete scale-space representation of the medical image.

6. The method of claim 3, wherein for each remaining scale-level t from t=M−2, . . . , 0, the trained search model for scale-level t for each anatomical landmark in the set of anatomical landmarks starts the search for the trajectory to the predicted landmark location from a convergence point of the trained search model for the previous scale level t+1 for that anatomical landmark.

7. The method of claim 1, wherein enforcing spatial coherence of the detected anatomical landmarks by fitting a learned shape model of the plurality of anatomical landmarks to the detected anatomical landmarks at the coarsest scale-level to robustly determine a set of the anatomical landmarks within a field-of-view of the medical image comprises:
fitting the learned shape model of the plurality of anatomical landmarks to the detected anatomical landmarks at the coarsest scale-level using an M-estimator sampling consensus based on random 3-point samples from the detected anatomical landmarks at the coarsest scale-level.

8. The method of claim 1, further comprising:
automatically determining a scan range of the medical image based on the set of anatomical landmarks at a final scale-level of the discrete scale-space representation of the medical image based on the learned shape model of the plurality of anatomical landmarks.

9. The method of claim 8, wherein automatically determining a scan range of the medical image based on the set of anatomical landmarks at a final scale-level of the discrete scale-space representation of the medical image based on the learned shape model of the plurality of anatomical landmarks comprises:
interpolating scan range values between detected landmark locations in the in the final scale-level of the discrete scale-space representation of the medical image of a minimum anatomical landmark along a z-axis in the learned shape model and a maximum anatomical landmark along the z-axis in the learned shape model, wherein the detected landmark location of the minimum anatomical landmark defines a 0% point and the detected landmark location of the maximum anatomical landmark defines a 100% point; and
extrapolating scan range values above the detected landmark location of the maximum anatomical landmark or below the detected landmark location of the minimum anatomical landmark using an estimated scale parameter of the fitted shape model.

10. An apparatus for automated spatially-consistent detection of anatomical landmarks in a medical image of a patient, comprising:
means for generating a discrete scale-space representation of a medical image of a patient, wherein the discrete scale-space representation of the medical image includes a plurality of scale-levels;
means for detecting a plurality of anatomical landmarks at a coarsest scale-level of the discrete scale-space representation of the medical image using a respective trained search model trained to predict a trajectory from a starting location to a predicted landmark location at the coarsest scale-level for each of the plurality of anatomical landmarks;
means for enforcing spatial coherence of the detected anatomical landmarks by fitting a learned shape model of the plurality of anatomical landmarks to the detected anatomical landmarks at the coarsest scale-level to robustly determine a set of the anatomical landmarks within a field-of-view of the medical image; and
means for refining the predicted landmark location for each of the landmarks in the set of anatomical landmarks at each remaining scale-level of the discrete scale-space representation of the medical image using, for each landmark in the set of anatomical landmarks, a respective trained search model trained to predict a trajectory to the predicted landmark location at each remaining scale-level, wherein the trained search model for each remaining scale-level for each landmark is constrained based on a range surrounding the predicted landmark location for that landmark at a previous scale-level.

11. The apparatus of claim 10, wherein for each anatomical landmark, the trained search model for each scale-level is an intelligent artificial agent that predicts the trajectory to the predicted landmark location at the corresponding scale-level by iteratively using a trained deep neural network (DNN) that inputs a region of interest surrounding a current location in the corresponding scale-level of the discrete scale-space representation of the medical image to calculate action-values corresponding to actions that move the current location in different direction and selecting an action having the highest action-value to be applied to the current location.

12. The apparatus of claim 11, wherein the discrete scale-space representation of the medical image includes M scale-levels from 0 to M−1, where scale-level 0 of the discrete scale-space representation of the medical image is the medical image at its original resolution and scale-level M−1 is the coarsest scale level, and the trained search model for the coarsest scale level M−1 for each landmark is a global search model that starts the search for the trajectory to the predicted landmark location from the center of the coarsest scale-level of the discrete scale-space representation of the medical image.

13. The apparatus of claim 12, wherein the trained search model for the coarsest scale level M−1 for each landmark is trained to reward trajectories that leave an image space of a training image through a correct image border when the corresponding landmark is missing from the training image.

14. The apparatus of claim 13, wherein the means for detecting a plurality of anatomical landmarks at a coarsest scale-level of the discrete scale-space representation of the medical image using a respective trained search model trained to predict a trajectory from a starting location to a predicted landmark location at the coarsest scale-level for each of the plurality of anatomical landmarks comprises:
means for predicting, for each of the plurality of anatomical landmarks, a trajectory to a predicted landmark location in the coarsest scale-level of the discrete scale-space representation of the medical image or a trajectory that leaves the image space of the discrete scale-space representation of the medical image.

15. The apparatus of claim 12, wherein for each remaining scale-level t from t=M−2, . . . , 0, the trained search model for scale-level t for each anatomical landmark in the set of anatomical landmarks starts the search for the trajectory to the predicted landmark location from a convergence point of the trained search model for the previous scale level t+1 for that anatomical landmark.

16. The apparatus of claim 10, further comprising:
means for automatically determining a scan range of the medical image based on the set of anatomical landmarks at a final scale-level of the discrete scale-space representation of the medical image based on the learned shape model of the plurality of anatomical landmarks.

17. A non-transitory computer readable medium storing computer program instructions for automated spatially-consistent detection of anatomical landmarks in a medical image of a patient, the computer program instructions when executed by a processor cause the processor to perform operations comprising:
generating a discrete scale-space representation of a medical image of a patient, wherein the discrete scale-space representation of the medical image includes a plurality of scale-levels;
detecting a plurality of anatomical landmarks at a coarsest scale-level of the discrete scale-space representation of the medical image using a respective trained search model trained to predict a trajectory from a starting location to a predicted landmark location at the coarsest scale-level for each of the plurality of anatomical landmarks;
enforcing spatial coherence of the detected anatomical landmarks by fitting a learned shape model of the plurality of anatomical landmarks to the detected anatomical landmarks at the coarsest scale-level to robustly determine a set of the anatomical landmarks within a field-of-view of the medical image; and
refining the predicted landmark location for each of the landmarks in the set of anatomical landmarks at each remaining scale-level of the discrete scale-space representation of the medical image using, for each landmark in the set of anatomical landmarks, a respective trained search model trained to predict a trajectory to the predicted landmark location at each remaining scale-level, wherein the trained search model for each remaining scale-level for each landmark is constrained based on a range surrounding the predicted landmark location for that landmark at a previous scale-level.

18. The non-transitory computer readable medium of claim 17, wherein for each anatomical landmark, the trained search model for each scale-level is an intelligent artificial agent that predicts the trajectory to the predicted landmark location at the corresponding scale-level by iteratively using a trained deep neural network (DNN) that inputs a region of interest surrounding a current location in the corresponding scale-level of the discrete scale-space representation of the medical image to calculate action-values corresponding to actions that move the current location in different direction and selecting an action having the highest action-value to be applied to the current location.

19. The non-transitory computer readable medium of claim 18, wherein the discrete scale-space representation of the medical image includes M scale-levels from 0 to M−1, where scale-level 0 of the discrete scale-space representation of the medical image is the medical image at its original resolution and scale-level M−1 is the coarsest scale level, and the trained search model for the coarsest scale level M−1 for each landmark is a global search model that starts the search for the trajectory to the predicted landmark location from the center of the coarsest scale-level of the discrete scale-space representation of the medical image.

20. The non-transitory computer readable medium of claim 19, wherein the trained search model for the coarsest scale level M−1 for each landmark is trained to reward trajectories that leave an image space of a training image through a correct image border when the corresponding landmark is missing from the training image.

21. The non-transitory computer readable medium of claim 20, wherein detecting a plurality of anatomical landmarks at a coarsest scale-level of the discrete scale-space representation of the medical image using a respective trained search model trained to predict a trajectory from a starting location to a predicted landmark location at the coarsest scale-level for each of the plurality of anatomical landmarks comprises:
for each of the plurality of anatomical landmarks, predicting a trajectory to a predicted landmark location in the coarsest scale-level of the discrete scale-space representation of the medical image or a trajectory that leaves the image space of the discrete scale-space representation of the medical image.

22. The non-transitory computer readable medium of claim 19, wherein for each remaining scale-level t from t=M−2, . . . , 0, the trained search model for scale-level t for each anatomical landmark in the set of anatomical landmarks starts the search for the trajectory to the predicted landmark location from a convergence point of the trained search model for the previous scale level t+1 for that anatomical landmark.

23. The non-transitory computer readable medium of claim 17, wherein enforcing spatial coherence of the detected anatomical landmarks by fitting a learned shape model of the plurality of anatomical landmarks to the detected anatomical landmarks at the coarsest scale-level to robustly determine a set of the anatomical landmarks within a field-of-view of the medical image comprises:
fitting the learned shape model of the plurality of anatomical landmarks to the detected anatomical landmarks at the coarsest scale-level using an M-estimator sampling consensus based on random 3-point samples from the detected anatomical landmarks at the coarsest scale-level.

24. The non-transitory computer readable medium of claim 17, wherein the operations further comprise:
automatically determining a scan range of the medical image based on the set of anatomical landmarks at a final scale-level of the discrete scale-space representation of the medical image based on the learned shape model of the plurality of anatomical landmarks.

25. The non-transitory computer readable medium of claim 24, wherein automatically determining a scan range of the medical image based on the set of anatomical landmarks at a final scale-level of the discrete scale-space representation of the medical image based on the learned shape model of the plurality of anatomical landmarks comprises:
interpolating scan range values between detected landmark locations in the in the final scale-level of the discrete scale-space representation of the medical image of a minimum anatomical landmark along a z-axis in the learned shape model and a maximum anatomical landmark along the z-axis in the learned shape model, wherein the detected landmark location of the minimum anatomical landmark defines a 0% point and the detected landmark location of the maximum anatomical landmark defines a 100% point; and
extrapolating scan range values above the detected landmark location of the maximum anatomical landmark or below the detected landmark location of the minimum anatomical landmark using an estimated scale parameter of the fitted shape model.

\* \* \* \* \*